（12）United States Patent
Havens et al.

(10) Patent No.: US 8,177,134 B2
(45) Date of Patent: May 15, 2012

(54) MULTIPLE RANGE INDICIA READER WITH SINGLE TRIGGER ACTUATION

(75) Inventors: William H. Havens, Syracuse, NY (US); Ynjiun Paul Wang, Cupertino, CA (US); George Arthur Plesko, Chadds Ford, PA (US); Donald Anderson, Locke, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 112 days.

(21) Appl. No.: 12/840,499

(22) Filed: Jul. 21, 2010

(65) Prior Publication Data
US 2012/0018517 A1  Jan. 26, 2012

(51) Int. Cl.
G06K 7/10 (2006.01)
H02P 1/00 (2006.01)

(52) U.S. Cl. .................. 235/462.3; 235/462.22

(58) Field of Classification Search ............... 235/462.3, 235/462.32, 462.22, 462.2, 462.01
See application file for complete search history.

(56) References Cited

U.S. PATENT DOCUMENTS

| | | | |
|---|---|---|---|
| 5,340,971 A | 8/1994 | Rockstein et al. | |
| 5,979,769 A | 11/1999 | Munro et al. | |
| 5,992,744 A | 11/1999 | Smith et al. | |
| 6,863,217 B2 | 3/2005 | Hudrick et al. | |
| 7,219,843 B2 | 5/2007 | Havens et al. | |
| 7,389,929 B2 | 6/2008 | Havens et al. | |
| 7,534,994 B2 | 5/2009 | Check | |
| 2003/0226895 A1 | 12/2003 | Havens et al. | |
| 2007/0176003 A1 | 8/2007 | Brock | |
| 2010/0308115 A1* | 12/2010 | Liou | 235/462.22 |

* cited by examiner

Primary Examiner — Edwyn Labaze
(74) Attorney, Agent, or Firm — Hiscock & Barclay, LLP

(57) ABSTRACT

A method of operating an indicia reader for reading information bearing indicia (IBI) positioned in a field of view of the reader includes: transmitting a first laser light beam adapted for scanning an IBI on a target located a first distance from the indicia reader; transmitting a second laser light beam adapted for scanning an IBI on a target located a second distance greater than the first distance from the indicia reader; activating at least one of the first and second laser light beams; scanning at least one of the laser light beams with a flat unitary scan mirror to generate at least one of a first laser light beam pattern and a second laser light beam pattern; directing light reflected from the target from either the first or second laser light beams patterns through a common receive path; the common receive path including being reflected with the flat unitary scan mirror onto a focusing mirror; the focusing mirror directing reflected light along a directed reflected light path; the directed reflected light path including an optical filter outputting directed reflected light; converting the directed reflected light into an output signal with a photodetector; decoding IBI information derived from the output signal, wherein the operating steps are completed by devices supported in a hand held indicia reader housing and wherein an operator selectively activates the first laser light beam and/or the second laser light beam with a single action trigger.

19 Claims, 7 Drawing Sheets

MULTIPLE RANGE INDICIA READER WITH SINGLE TRIGGER ACTUATION

FIELD OF THE INVENTION

The present invention relates to indicia reading devices, and more particularly to an indicia reader configured to read near and far indicia with a single action trigger.

BACKGROUND

Indicia reading devices (also referred to as scanners, laser scanners, image readers, indicia readers, etc.) typically read data represented by printed or displayed information bearing indicia (IBI), (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by a processor which performs signal and/or image processing to extract the data represented by the symbol. Indicia reading devices typically utilize visible or infrared light. Laser indicia reading devices typically utilize transmitted laser light.

One-dimensional (1D) indicia readers are characterized by reading data that is encoded along a single axis, in the widths of bars and spaces, so that such symbols may be read from a single scan along that axis, provided that the symbol is sampled with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, some or all of which must be scanned and decoded, then linked together to form a complete message. Scanning still requires relatively higher resolution in one dimension only, but multiple linear scans at different locations on a second dimension are needed to read the whole symbol.

A class of bar code symbologies known as two dimensional (2D) matrix symbologies have been developed which require image based reading and offer greater data densities and capacities than 1D symbologies. 2D matrix codes encode data as dark or light data elements within a regular polygonal matrix, accompanied by graphical finder, orientation and reference structures.

Often times an indicia reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or transceiver for communicating with a remote computer.

Efforts regarding such systems have led to continuing developments to improve their versatility, practicality and efficiency.

DETAILED DESCRIPTION

Reference will now be made to exemplary embodiments which are illustrated in the accompanying drawings. Other embodiments may be in various forms and the exemplary embodiments should not be construed as limited to the embodiments set forth herein. Rather, these representative embodiments are described in detail so that this disclosure will be thorough and complete, and will fully convey the scope, structure, operation, functionality, and potential applicability to those skilled in the art. Wherever possible, the same reference numbers will be used throughout the drawings to refer to the same or like parts. The term "scan" or "scanning" used herein refers to reading or extracting data from an information bearing indicia (or symbol). The term imaging used herein refers to the taking or creation of an electronic image.

Figure 1:
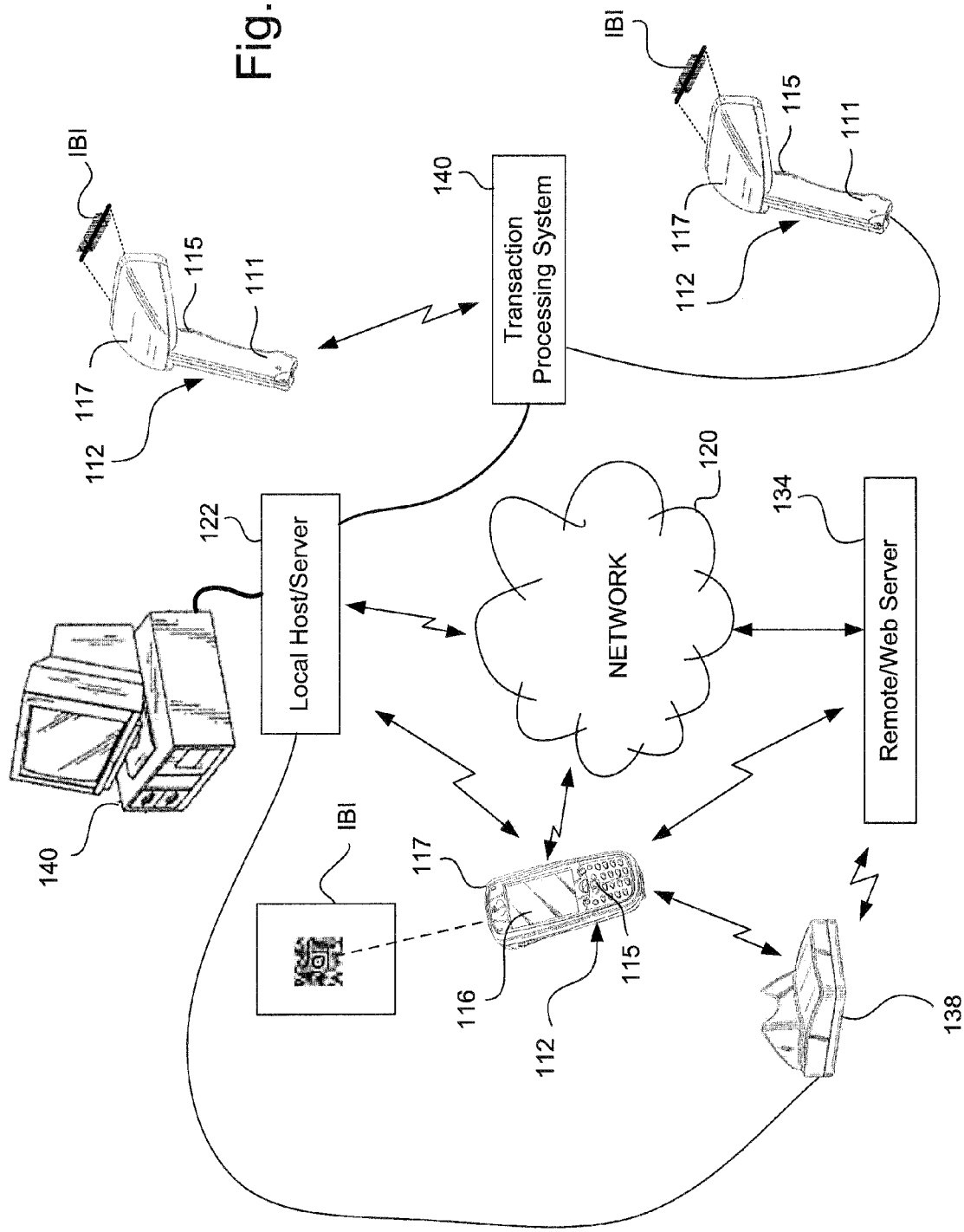
FIG. 1 is a block diagram of an exemplary indicia reader system.

FIG. 1 illustrates an exemplary scanning system configuration, wherein a plurality of indicia readers 112 are operated and utilized where information bearing indicia (IBI) are present. The indicia readers may be stationary or hand-held and may be either laser indicia reading devices (or laser scanners) utilizing transmitted laser light or imaging indicia reading devices, also known as optical imaging devices or optical indicia reading devices, utilizing image capturing devices for extracting data from IBIs.

An operator may aim a hand-held indicia reader 112 at a target containing an IBI, dataform, text, or other data to be collected and actuate a button or trigger 115 on the indicia reader to control full or partial operation of the reader, such as to activate scanning of an IBI. An IBI or dataform may be an originally machine generated symbology that is also machine readable, such as a 1-D barcode, a 2-D barcode, a 1-D stacked barcode, a logo, glyphs, color-codes, and the like.

An exemplary indicia reader 112 may be a mobile device, such as a hand held scanner, a portable data terminal (PDT), personal digital assistant (PDA), mobile phone, etc. A Portable Data Terminal, or PDT, is typically an electronic device that is used to enter or retrieve data via wireless transmission (WLAN or WWAN) and may also serve as an indicia reader used in stores, warehouse, hospital, or in the field to access a database from a remote location. Personal Digital Assistants (PDAs) are handheld devices typically used as a personal organizer, and may have many uses such as calculating, use as a clock and calendar, playing computer games, accessing the Internet, sending and receiving E-mails, use as a radio or stereo, video recording, recording notes, use as an address book, and use as a spreadsheet. An exemplary indicia reader may have a display 116. An exemplary indicia reader 112 may have a number of subsystems provided within a housing 117 configured to be hand held. For example, the reader may have a handle portion 111.

Exemplary indicia readers may be in communication (wired or wireless) to a local transaction processing system 140, such as a cash register, customer station or employee station or local host/server 122 directly or through a charging station or base 138. An exemplary local server 122 or indicia reader 112 may be in communication with network 120 and or a remote/web server 134.

Figure 2:
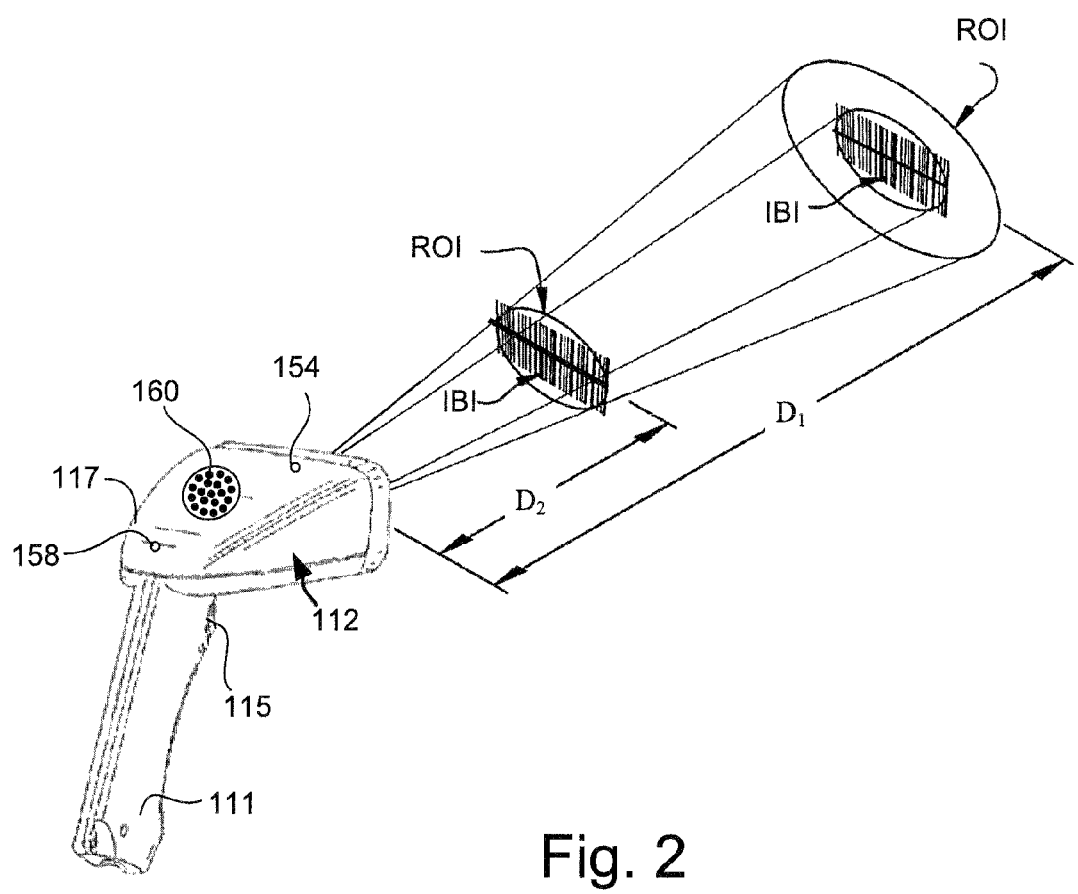
FIG. 2 is a perspective view of an exemplary indicia reader scanning near and far indicia.

FIG. 2 illustrate an exemplary indicia reader 112 configured to scan an IBI located a first distance $D_1$ from the reader in a far scan mode and scan an IBI located a second closer distance $D_2$ from the reader in a near scan mode, wherein the reader alternates scanning in the near and far scan modes with successive pulls on the trigger 115 or pushes on a button.

Exemplary trigger mode configurations may be the following modes:

A. A single trigger pull initiates only near scan and the reader continues scanning until either a good IBI read or a time out.

B. A single trigger pull initiates only far scan and the reader continues scanning until either a good IBI read or a time out.

C. A single trigger pull initiates alternating near/far scanning starting with far scanning.

D. A single trigger pull initiates alternating near/far scanning starting with near scanning.

E. A single trigger pull initiates near/far scanning starting with near scanning and switching to far scanning at a next trigger pull, then alternating for successive trigger pulls.

F. A single trigger pull initiates near/far scanning starting with far scanning and switching to near scanning at a next trigger pull, then alternating for successive trigger pulls.

G. A single trigger pull initiates near scanning, and a double trigger pull initiates far scanning.

H. A single trigger pull initiates far scanning and a double trigger pull initiates near scanning.

An exemplary trigger may be a standard single click (or action) trigger. Exemplary trigger functionality may be accomplished in software.

The various triggering modes may be either preprogrammed or be made menu selectable by an operator, wherein a display or graphic user interface (GUI) displays a menu of selectable near/far scanning, or trigger actuation functionality for selecting near/far scanning or alternately by scanning specially encoded menuing bar code symbols.

In an exemplary embodiment, the various triggering modes may be programmed by scanning and decoding an IBI with programming instruction information provided in the IBI. For example, an IBI may have programming instructions to program the reader to operate with one of following reader trigger modes: a single pull trigger pull initiates alternating the near and far scanning modes starting with the near scanning mode; a single pull trigger pull initiates alternating the near and far scanning modes starting with the far scanning mode; a single pull trigger pull initiates near/far scanning starting with near scanning and switching to far scanning at a next trigger pull, then alternating for successive trigger pulls; and a single pull trigger pull initiates near/far scanning starting with far scanning and switching to near scanning at a next trigger pull, then alternating for successive trigger pulls.

In an exemplary embodiment, near/far trigger mode selection may be accomplished by utilizing the scanner to scan menuing barcodes to make the selection. For example, one or more "far" scan menu indicia may be scanned to put the reader in a far scanning mode. The far scan menu indicia may contain programming instructions to change the scanning mode. The reader may afterwards be switched to the near scanning mode by scanning one or more near menu scanning indicia containing instructions to program the reader to change to the near scanning mode.

In an exemplary embodiment, the reader may not be able to read an IBI at both distances in only the near scan mode nor read the IBI at both distances in only the far scan mode.

In an exemplary embodiment, a far distance IBI is located out of the scanning range of the reader when operating in the near scan mode.

In an exemplary trigger mode embodiment, the reader is provided with a single scan engine to scan the IBI at the first distance and a second scan engine to scan the IBI at the second distance, wherein the reader alternates between near and far scanning modes with successive pulls on the trigger 115. Changing near and far scanning modes may be accomplished by changing configuration settings of the scan engine.

In an exemplary embodiment, a reader comprises a dual laser scanner including a near scanning laser and a far scanning laser provided in a single scanning module, wherein either the near scanning laser or the far scanning laser may be selected, for example, with a single scanner trigger. The selection of the near/far laser scanner functionality may be optimized for different scanning environments.

Figure 3:
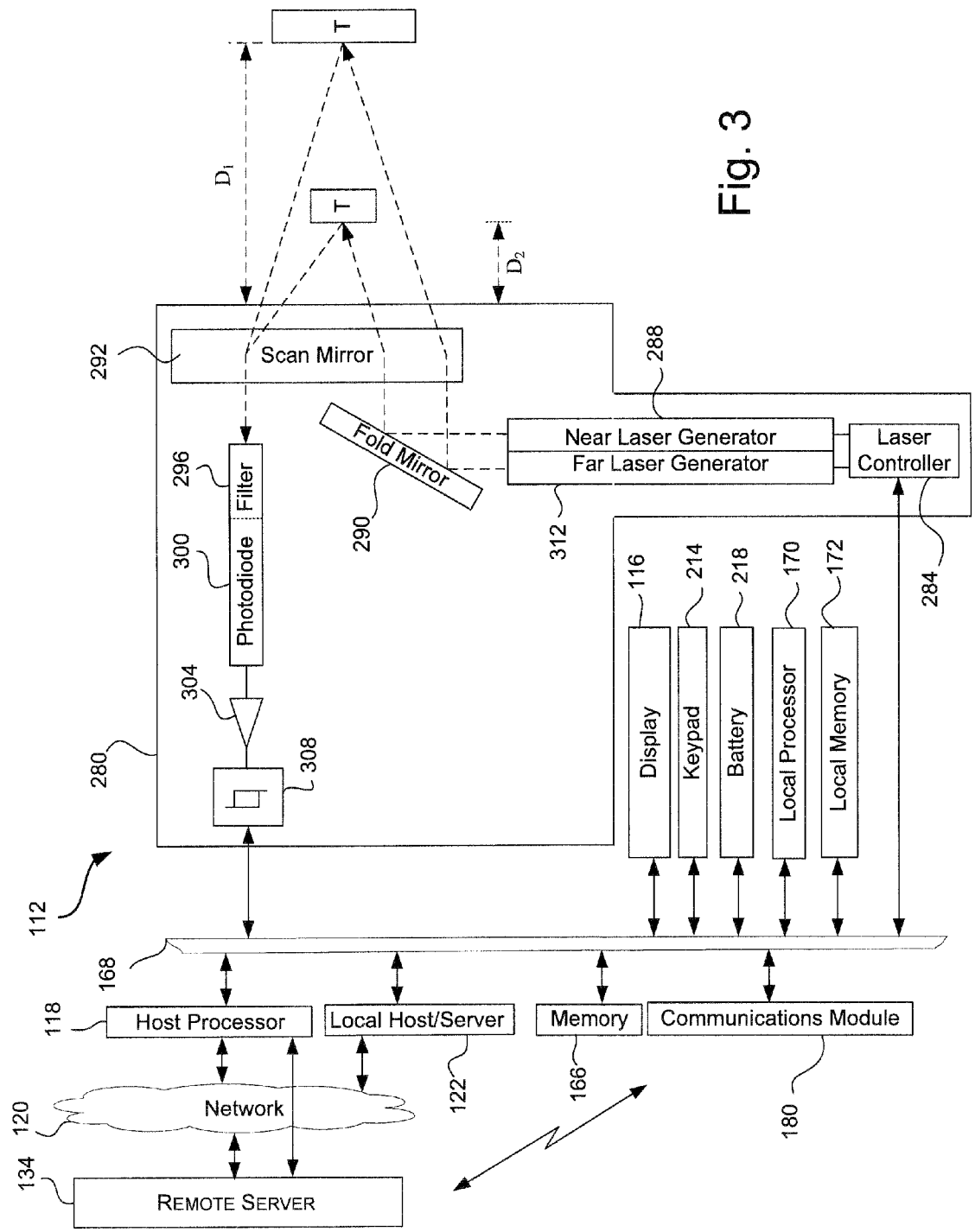
FIG. 3 is a simplified schematic block diagram of an exemplary laser indicia reader.

Referring to FIG. 3, an exemplary indicia reader 112 may comprise a number of exemplary subsystems, such as a laser scan engine 280 (or laser scanning reader system) for reading indicia on a target T. The laser scanning reader system may comprise a laser controller 284 for controlling a near laser generator 288 for generating a near laser beam which is directed onto a folding mirror 290 which then directs the beam to an oscillating or rotating scan mirror 292 and then onto a near target T. The near laser scanning pattern is reflected off of the target and redirected by scan mirror 292 into a receive path comprising a laser light pass filter 296, a photodiode 300, an amplifier 304 and a digitizer 308. Laser controller 284 may also control a far laser generator 312 for generating a far laser beam which is directed onto a folding mirror 290 which then directs the beam to the oscillating or rotating scan mirror 292 onto a far target T. The far laser scanning pattern is reflected off of the target and redirected by scan mirror 292 into the receive path. Optical filters are utilized for removing wavelengths of unwanted lights.

In exemplary embodiments near and far laser generators, are disposed in close proximity or adjacent to one another in order for the scan engine to utilize a singular receive path. One or more laser controllers may used to control the near and far laser generators. Two lasers in a common engine may be utilized for both long and short range scanning.

In exemplary embodiments, the near and far laser generators may provide different laser beam characteristics, wherein the output laser light beams differ in shape, height, width or narrowness.

In an exemplary embodiment, the near and far laser generators may provide output laser light beams which differ in light intensity.

Laser light may be described as a spatially coherent, narrow low-divergence beam of light.

The width of the laser beam pattern on the target may be defined in terms of a laser beam scan angle. The first and second laser light beam patterns may have different scan angles.

Digitizer 308 may convert an analog signal output by the photodiode into a digital signal representative of the light reflected off of the targets.

Exemplary laser scanners use a laser beam as the light source and employ either a reciprocating mirror or a rotating prism to scan the laser beam back and forth across the IBI. One or more photodiodes are used to measure the intensity of the light reflected back from the bar code. The light reflected back to the reader is modulated in brightness by the IBI and the photodiode receive circuit is optimized to detect signals with the modulated patterns.

An exemplary photodetector or photosensor may be comprised of one or more photodiodes that converts incident light energy into electric charge that is an output signal representative of light reflected off an IBI. The output of the photodetector may be processed utilizing one or more functions or algorithms to condition the signal appropriately for use in further processing downstream.

The output signal of the photodetector may be processed utilizing one or more functions or algorithms to condition the signal appropriately for use in further processing downstream, including decoding of IBIs. Laser scanning reader system 280 may be configured for scanning an IBI at a distance $D_1$ and at a distance $D_2$, which is a shorter distance from the reader 112 than $D_1$.

Other exemplary reader subsystems or components supported by the housing may include one or more local or on board processor(s) 170, local memory 172, a battery 218, a display 116, a key pad 214 and a wireless communications module 180. The subsystems may communicate via one or more bus 168, data lines or other signal or data communication form. The indicia reader may communicate with one or more host processor(s) 118, a local host/server 122, local memory 166, network 120 or remote server host/server 134.

Communications module 180 may provide a communication link from imaging reader 112 to other indicia readers or to other systems such as a server/remote processor 134.

The processor(s) may be located on board or within the housing with other subsystems. The particulars of the functionality of the processor(s) and the reader may be determined by or based upon certain configuration settings or data which may be stored in firmware, remote or local memory.

An exemplary processor may be a mixed-signal array with on-chip controller devices designed to replace multiple traditional MCU-based system components with one single-chip programmable device. It may include configurable blocks of analog and digital logic, as well as programmable interconnects.

The reader subsystems in the reader may be connected by one or more bus 168, data lines or other signal or data communication form. Exemplary forms may be an Inter-IC bus such as a two wire interface (TWI), dedicated data bus, RS232 interface, USB, etc.

The processor(s) may include a predetermined amount of memory for storing firmware and data. The firmware may be a software program or set of instructions embedded in or programmed on the processor(s) which provides the necessary instructions for how the processor(s) operate and communicate with other hardware. The firmware may be stored in the flash memory (ROM) of the processor(s) as a binary image file and may be erased and rewritten. The firmware may be considered "semi-permanent" since it remains the same unless it is updated. This firmware update or load may be handled by a device driver.

The processor(s) may be utilized to perform a number of functional operations, which may involve the performance of a number of related steps, the particulars of which may be determined by or based upon certain configuration settings stored in firmware or memory which may be any one of a number of memory types such as RAM, ROM, EEPROM, etc. In addition some memory functions may be stored in memory provided as part of the processor(s).

Exemplary functions of the processor(s) may be controlling operation of the scan engine, decoding functions and operator interface functions. Operating software may be utilized to operate the processor(s) for such functions seemingly simultaneously or in a multitasking role. An exemplary image reader operating software architecture may be organized into processes or threads of execution.

Processor(s), memory and associated circuitry which perform or control the exemplary scan and decoding functions may be provided in the scan engine or on associated circuit boards which are located within the housing of the reader. Decoding is a term used to describe the interpretation of a machine readable code contained in the photodetector output signal.

An exemplary function of the processor(s) may be to decode machine readable symbology provided within the target or captured image. One dimensional symbologies may include very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. 2D symbologies may include Aztec, Datamatrix, Maxicode, QR-code, or other 2D symbologies.

Operation of the decoding, which may be executed in a user or factory selectable relationship to a scanning routine, may be governed by parameters or configuration settings. Combinations of scanning and decoding parameters together define scanning-decoding operating relationships or modes which the reader will use. Two exemplary operating modes may be continuous or discontinuous. In the continuous operating mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader. In the continuous operating mode, the reader takes continuous scans one after another (seriatim) and continuously decodes or attempts to decode some or all scanned targets. Discontinuous operating mode is a mode wherein scanning and/or decoding is initiated with an actuation event, such as pulling of a pull trigger 115, or the receipt of an electronic enabling signal and scanning and/or decoding is terminated with a timeout, or a successful read. An exemplary utilization of the reader in discontinuous operating mode is via hand held operation. Decoding stops once the indicia reader is no longer triggered the reader has timed out or a successful read is made. The discontinuous operating mode is typically initiated because the operator knows a symbol is present.

Exemplary indicia readers may use memory or firmware to store certain reader settings or reader configuration settings. Exemplary configuration settings may be selection of scanning distance, trigger mode functionality, pre-defined bar code output data based on the scan input, continuous scanning operating mode, discontinuous scanning operating mode or routine, decoding mode or routine, I/O configurations, symbology enablement, output interface functionality, min/max symbology character lengths, scan engine selection, illumination functionality, settings that affect the functional operation of the processor(s), which codes are enabled for processing, aimer operation, engine orientation, illumination, photosensor functionality, software control, sales tracking or warranty tracking, reader capabilities, selection of scan angle for wide or narrow, laser selection for far or near scanning, selection of laser intensity control, etc.

Readers and a host system may be equipped with the ability to automatically query and communicate data, such as configuration settings or firmware amongst each other. Upgrading firmware from host to reader and duplicating configuration settings may be performed without human intervention to ensure readers are operating at the same revision and have the same configuration settings reduces user frustration, down time, data integrity and increase efficiencies.

Readers may be configured by means of bar codes menus or via serial connection using serial commands. A GUI interface may be utilized for creating or reading serial commands, such as Visual Menu or similar such product. This may be done locally or remotely by connecting the reader either directly or through a network (such as the internet) to a remote computer and having the remote computer provide software upgrades.

An exemplary embodiment for upgrading may be to provide a PC based software tool to read out the non-default configuration settings from a target reader device (the one being replaced) through a serial communication and then to flash the same or equivalent settings into the replacement equipment. This may be considered a direct configuration mapping method, that is, reading the configuration settings on a (old) Device A and flashing them into a (new) Device B.

Figure 4:
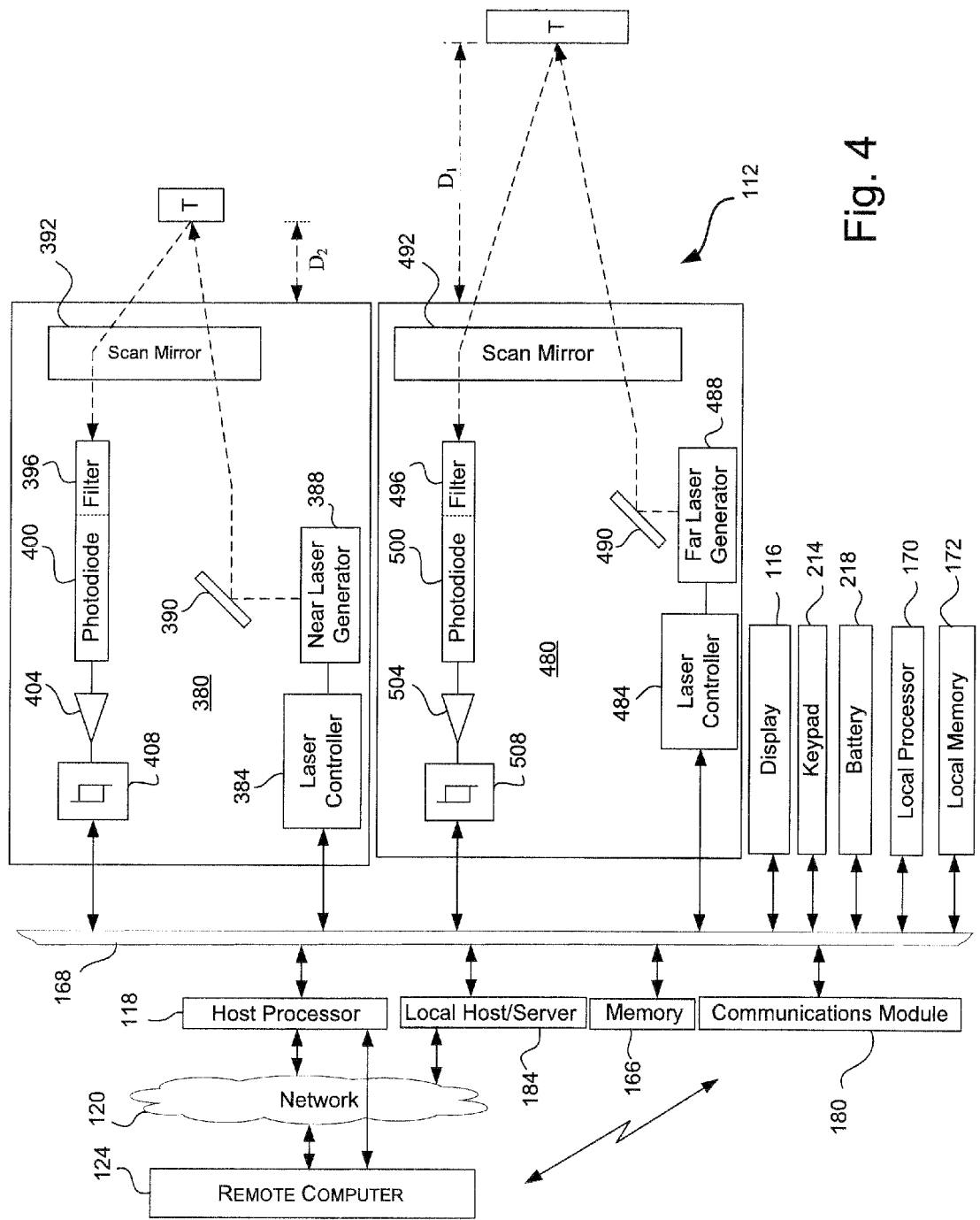
FIG. 4 is a simplified schematic block diagram of an exemplary laser indicia reader.

Referring to FIG. 4, an exemplary indicia reader 112 may comprise a number of exemplary subsystems, such as near laser scan engine 380 or laser scanning reader system for reading indicia on a target T. The laser scanning reader system may comprise a near laser controller 384 for controlling a near laser generator 388 for generating a near laser scanning beam which is directed onto a folding mirror 390 which then directs the scanning beam to an oscillating or rotating scan mirror 392 and then onto a near target T. The near laser scanning pattern is reflected off of the target and redirected by scan mirror 392 into a receive path comprising a laser light pass filter 396, a photodiode 400, an amplifier 404 and a digitizer 408.

Indicia reader 112 may also comprise a far laser scan engine 480 or laser scanning reader system for reading indicia on a far target T. A laser controller 484 may control a far laser generator 488 for generating a far laser scanning pattern which is directed by an oscillating or rotating scan mirror 492 onto a far target T. The far laser scanning pattern is reflected off of the target and redirected by scan mirror 492 into a receive path comprising a laser light pass filter 496, a photodiode 500, an amplifier 504 and a digitizer 508.

Figure 5:
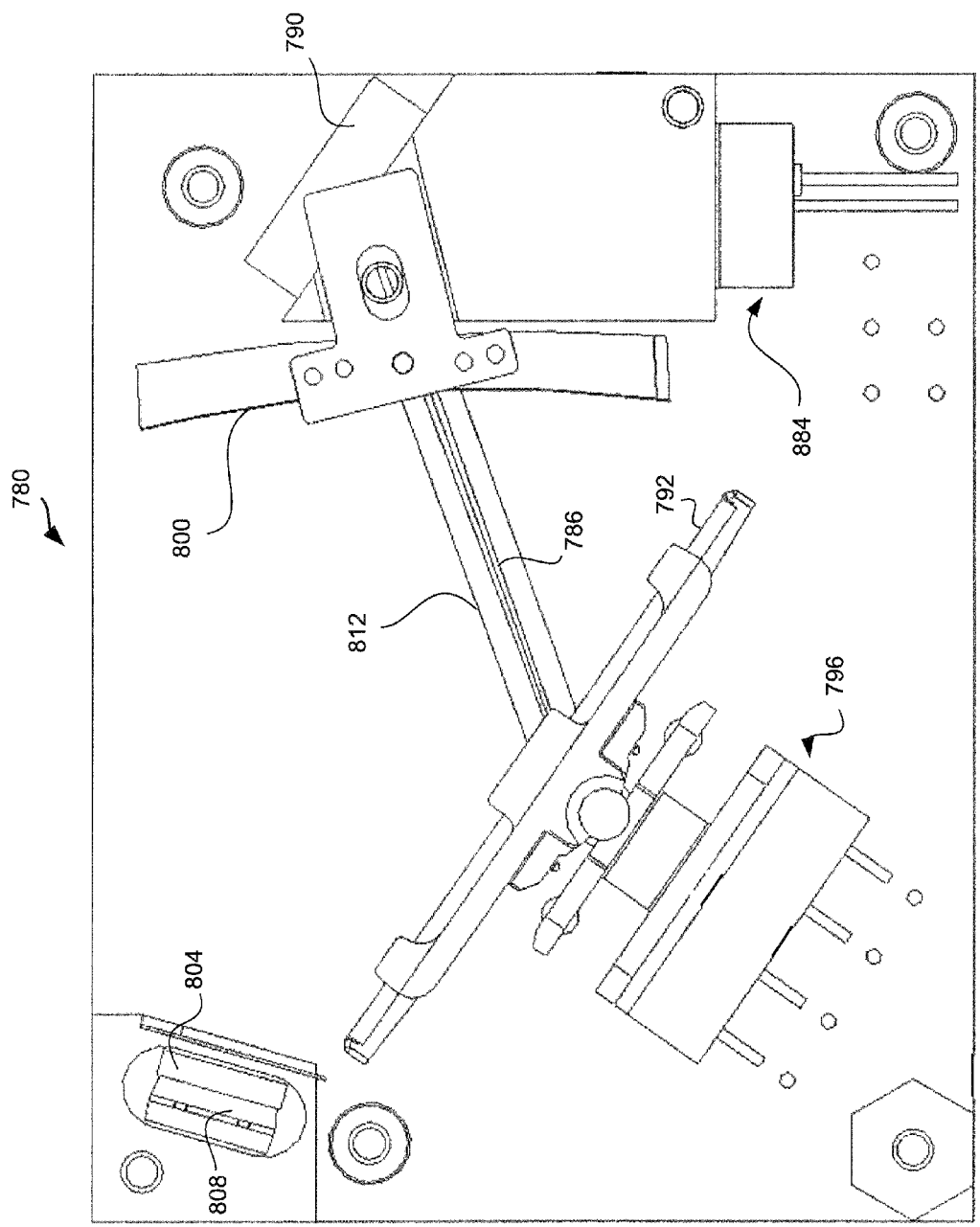
FIG. 5 is a top view of an exemplary laser scan engine.
Figure 6:
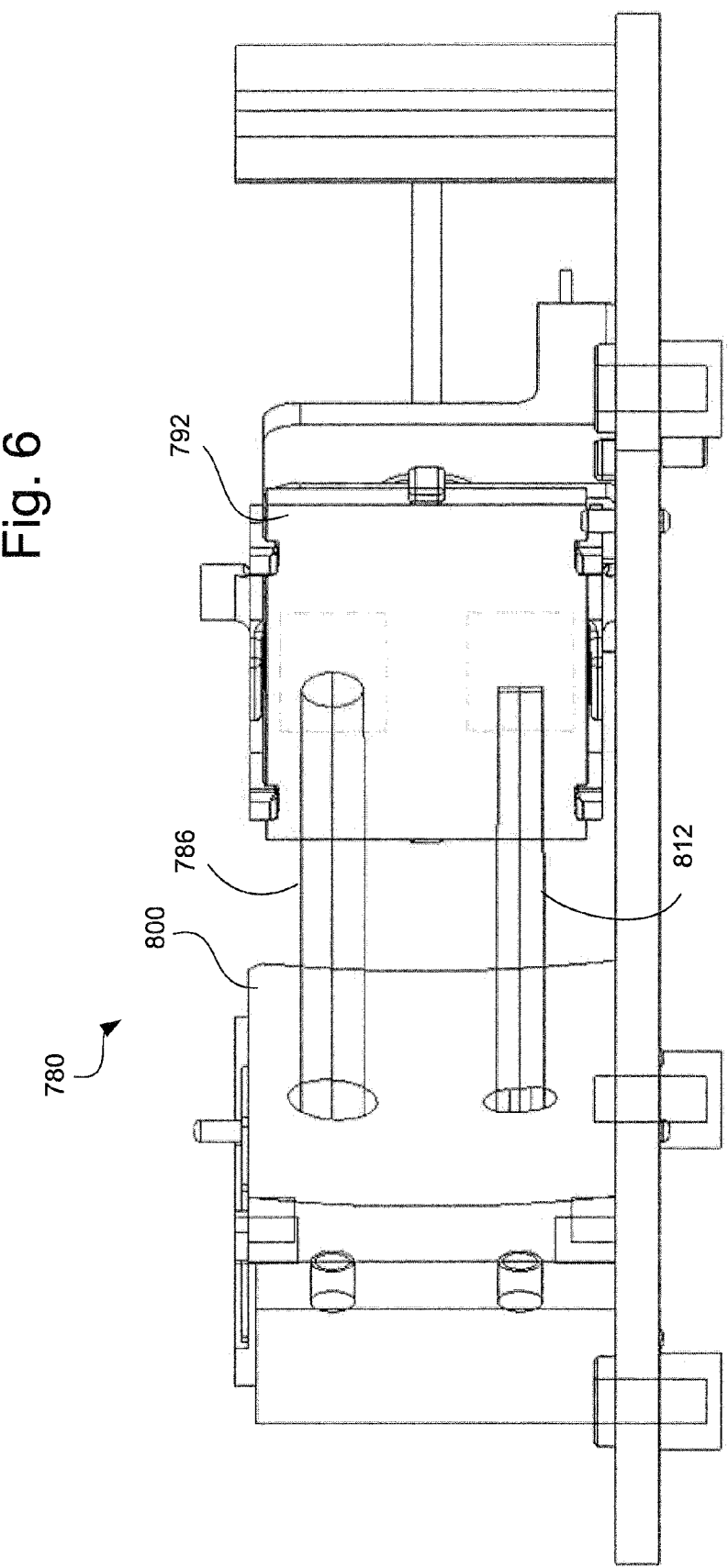
FIG. 6 is a side view of an exemplary laser scan engine.

Referring to FIGS. 5 and 6, an exemplary laser scan engine 780 may comprise a near laser generator system 784 for generating a near beam 786 which is directed onto a folding mirror 790 which then directs the near scanning beam to a scan mirror 792 which is oscillated or rotated by a scan mirror drive unit 796. The near laser scanning beam is reflected off of the scan mirror and onto a target. An exemplary scan mirror may be a front surface flat unitary mirror without the inclusion of other optical subsection mirror elements directed in other orientations. The near laser scanning beam is reflected off of the target, back onto the scan mirror 792 whereby the light is directed toward the focus mirror 800 and there focused by a focus mirror 800 into a receive path comprising a laser light pass filter 804, and photodiode 808. The resulting electrical signal is routed to an amplifier and a digitizer. A far laser generator system located directly beneath and blocked from view by near laser 784 may also generate a far laser scanning beam 812 which is directed onto a folding mirror 790 which then directs the far scanning beam to scan mirror 792 and reflected onto a target. The far laser scanning beam is reflected off of the target, redirected by the scan mirror and focused by focus mirror 800 into the receive path.

Figure 7:
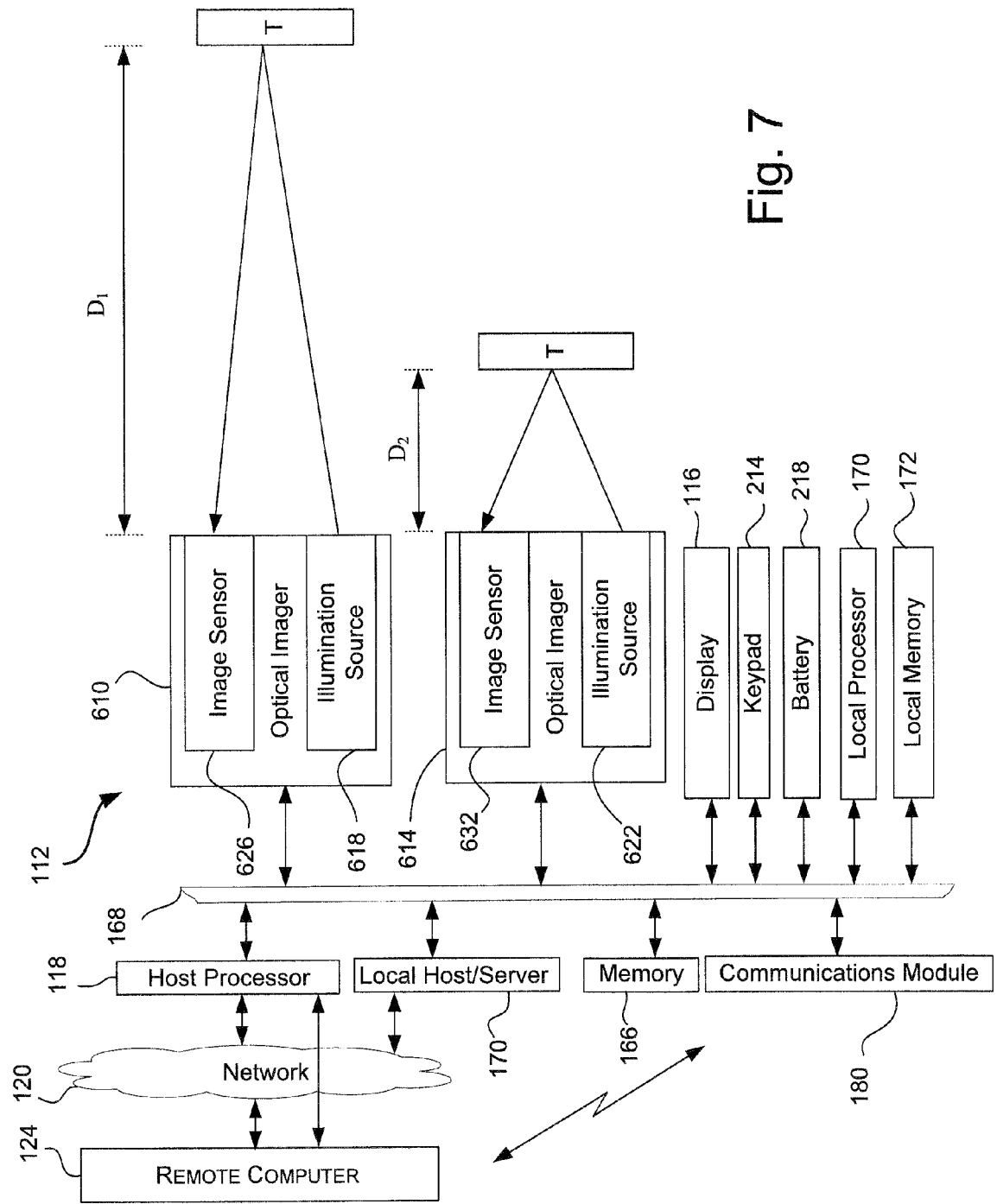
FIG. 7 is a simplified schematic block diagram of an exemplary imaging indicia reader.

Referring to FIG. 7, an exemplary indicia reader 112 may comprise a number of exemplary subsystems, such as one or more image engines (image indicia reader systems or image scan engines) 610, 614 for reading indicia on a target T. image scanner engine 610 is configured to scan indicia at a far distance $D_1$ from the reader and image scan engine 614 is configured to scan indicia at a near or closer distance $D_2$ from the reader. Image engines capture and read images to detect and decode IBIs located within the captured images. The image indicia reader systems may comprise one or more illumination source(s) 618, 622 for illuminating an IBI with a beam or pattern of incoherent light in the form of an illumination pattern and an image sensor 626, 632 for converting light reflected off a target T having an IBI provided thereon into representative output signals thereof. The output signal of the image sensor may be processed utilizing one or more functions or algorithms to condition the signal appropriately for use in further processing downstream, including decoding of IBIs. Image scan engine 610 may be configured for scanning IBIs at a distance D1 and image scan engine 614 may be configured for scanning IBIs at a distance D2, which is a shorter distance from the reader 112 than D1.

In an exemplary embodiment, the near and far image engines may provide target illumination patterns that differ in width or narrowness.

In an exemplary embodiment, the near and far image engines may provide target illumination patterns that differ in light intensity.

An exemplary image sensor converts light or other electromagnetic energy reflected off of a target and provides an output signal representative thereof. Image sensors may be an array of pixels adapted to operate in a global shutter or full frame shutter, mode or alternately operate in a rolling shutter mode. It may be a color or monochrome 2D solid state image sensor implemented in any of CCD, CMOS, NMOS, PMOS, CID, CMD, etc. The imager may be either a progressive or interleaved imager. The image sensor may contain an array of light sensitive photodiodes (or pixels) that convert incident light energy into electric charge. Many solid state image sensors also allow regions of a full frame of image data to be addressed.

In an exemplary embodiment, an indicia reader is provided both an image indicia reader and a laser scanner indicia reader, the activation of both readers being accomplished by an operator actuating a single trigger with multiple pulls. An indicia reader with dual imagers is described in commonly owned U.S. Pat. No. 5,992,744 entitled OPTICAL READER HAVING MULTIPLE SCANNING ASSEMBLIES WITH SIMULTANEOUSLY DECODED OUTPUTS, the entirety of which is hereby incorporated herein by reference.

In an exemplary embodiment, an operator repeatedly scans with either the near scan engine or the far scan engine repeatedly by actuating the trigger with a relatively long time delay between trigger actuations. The operator may select the other scan engine by actuating the trigger twice with a shorter time delay between the two trigger actuations. For example, an operator may be repeatedly scanning barcodes with a near scan beam pattern by actuating the trigger repeatedly with a relatively long time delay between scans (trigger actuations). When the operator wants to select scanning utilizing the far scan beam pattern, the operator may actuate the reader trigger twice in quick succession where the time delay between the two trigger actuations is shorter than the long time delay. The reader may then start scanning to read far targets. To select back to reading only near targets, the operator may actuate the trigger twice in rapid succession.

In an exemplary embodiment, an operator repeatedly scans with either the near scan engine or the far scan engine repeatedly by actuating the trigger with a relatively long time delay between trigger actuations. The operator may select the other scan engine by actuating the trigger twice with a shorter time delay between the two trigger actuations. For example, an operator may be repeatedly scanning barcodes with a near scan beam pattern by actuating the trigger repeatedly with a relatively long time delay between scans (trigger actuations). When the operator wants to select scanning utilizing the far scan beam pattern, the operator may actuate the reader trigger twice in quick succession where the time delay between the two trigger actuations is shorter than the long time delay. The reader may then start scanning to alternate reading between near and far targets with each successive trigger actuation. To select back to reading only near targets, the operator may actuate the trigger twice in rapid succession.

In an exemplary embodiment, one trigger actuation activates the reader to read near targets and two rapid trigger actuations changes the reader activation from reading near targets to reading far targets.

In an exemplary embodiment, one trigger actuation activates the reader to read far targets and two rapid trigger actuations changes the reader activation from reading far targets to reading near targets.

In an exemplary embodiment, two rapid trigger actuations changes the reader from exclusively reading near targets to reading far targets and three rapid trigger actuations changes the reader to alternately reading near and far targets with successive "slower" trigger actuations.

In an exemplary embodiment, indicia reader 112 may have one or more feedback systems for notifying an operator what trigger mode (far scan or near scan) the reader is in. The feedback system may be a display 116 for providing visual feedback, a LED 154 for providing visual feedback, a beeper 158 for providing audio feedback or a speaker 160 for providing audio feedback. The feedback system may, for example light one color LED for near mode and a second color LED for far mode. Different style beeps may be broadcast or a speaker may broadcast an audible message for different trigger modes.

In an exemplary embodiment the near indicia scan engine is a laser scan engine and the far indicia scan engine is an image engine.

In an exemplary embodiment the far indicia scan engine is a laser scan engine and the near indicia scan engine is an image engine.

In an exemplary embodiment an indicia reader has multiple scan engines which transmit light and receive light from a front face or front surface of a housing and both imagers scan out from a common face.

In an exemplary embodiment a method of operating an indicia reader for reading information bearing indicia (IBI) positioned in a field of view of the reader comprising the steps of: transmitting a first scan light beam pattern adapted for scanning an IBI on a target located a first distance from the indicia reader; transmitting a second scan light beam pattern adapted for scanning an IBI on a target located a second distance greater than the first distance from the indicia reader; activating the first and second scan beam patterns; directing light reflected from the target from either the first or second scan light beams through a common receive path; converting the directed reflected light into a representative output signal; decoding IBI information derived from the first and second output signals, wherein the transmitting, converting, directing, activating and decoding steps are completed by devices supported in a hand held indicia reader housing and wherein an operator selectively activates either the first scan beam pattern or the second scan beam pattern.

It should be understood that the programs, processes, methods and apparatus described herein are not related or limited to any particular type of computer or network apparatus (hardware or software). Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa. The illustrated embodiments are exemplary only, and should not be taken as limiting the scope of the present invention. Also, unless applicants have expressly disavowed any subject matter within this application, no particular embodiment or subject matter is considered to be disavowed herein.

The invention claimed is:

1. A method of operating an indicia reader for reading information bearing indicia (IBI) positioned in a field of view of the reader comprising the steps of:
    transmitting a first laser light beam adapted for scanning an IBI on a target located a first distance from the indicia reader;
    transmitting a second laser light beam adapted for scanning an IBI on a target located a second distance greater than the first distance from the indicia reader;
    activating at least one of the first and second laser light beams;
    scanning at least one of the laser light beams with a flat unitary scan mirror to generate at least one of a first laser light beam pattern and a second laser light beam pattern;
    directing light reflected from the target from either the first or second laser light beams patterns through a common receive path;
        the common receive path including being reflected with the flat unitary scan mirror onto a focusing mirror;
        the focusing mirror directing reflected light along a directed reflected light path;
        the directed reflected light path including an optical filter outputting directed reflected light;
    converting the directed reflected light into an output signal with a photodetector;
    decoding IBI information derived from the output signal, wherein the operating steps are completed by devices supported in a hand held indicia reader housing and wherein an operator selectively activates the first laser light beam and/or the second laser light beam with a single action trigger.

2. A method in accordance with claim 1, wherein the operator selectively activates the first or second laser light beam patterns by successively actuating a single pull trigger.

3. A method in accordance with claim 1, further comprising a display and a single pull trigger for activating the first and second laser light beam, and wherein the operator selectively activates the first or second laser light beam pattern by selecting either the first or second laser light beam pattern utilizing the display and activating the selected laser light beam pattern with a single pull trigger.

4. A method in accordance with claim 1, further comprising a single pull trigger for activating the first and second laser light beams,
    wherein the operator selects activation between the first and second laser light beam patterns by twice successively actuating the trigger with a first time delay between successive trigger actuations, and
    wherein the operator repeatedly activates the selected laser light beam pattern by successively actuating the trigger with a second time delay between successive trigger actuations, the second time delay being longer than the first time delay.

5. A method in accordance with claim 1, wherein selectively activating comprises at least one of the following: a single pull trigger pull initiates alternating the first and second laser light beams starting with the first laser light beam; a single pull trigger pull initiates alternating the first and second laser light beams starting with the second laser light beam; a single pull trigger pull initiates near/far scanning starting with the first laser light beam and switches to the second laser light beam with a next trigger pull, then alternating for successive trigger pulls; a single pull trigger pull initiates near/far scanning starting with the second laser light beam and switching to the first laser light beam with a next trigger pull, then alternating for successive trigger pulls.

6. A method in accordance with claim 1, wherein selectively activating comprises decoding an IBI with programming instruction information provided therein.

7. A method in accordance with claim 1, further comprising a notification device for audibly or visually notifying the operator whether the reader is in a near or far scanning mode.

8. A method in accordance with claim 1, further comprising a notification device for audibly or visually notifying the operator whether the reader has made a successful read.

9. A method in accordance with claim 1, wherein the first and second laser light beams differ in at least one of the following: shape; height; width; narrowness and intensity.

10. A method in accordance with claim 1, wherein the first and second laser light beam patterns differ in scan angle.

11. A method in accordance with claim 1, wherein selectively activating comprises at least one of the following: a single trigger actuation activates the first laser light beam and two rapid trigger actuations activates the second laser light beam; or a single trigger actuation activates the second laser light beam and two rapid trigger actuations activates the first laser light beam.

12. An indicia reader for reading information bearing indicia (IBI) positioned in a field of view of the reader comprising:
  a first light generator for transmitting a first light beam for scanning an IBI on a target located a first distance from the indicia reader in a near scanning mode;
  a second light generator for transmitting a second light beam for scanning an IBI on a target located a second distance greater than the first distance from the indicia reader in a far scanning mode;
  a single pull trigger for activating the first and second light generators;
  a receive system for directing light reflected from the target from either the first or second light beams through a receive path;
  a photodetector for converting the directed reflected light into a representative output signal; and,
  a decoder for decoding IBI information derived from the output signal,
  wherein the first light generator, second light generator, trigger, receive system, photodetector and decoder are supported in a hand held housing and wherein an operator selectively activates the first light generator and/or the second light generator with the single pull trigger.

13. An indicia reader in accordance with claim 12, wherein the operator selectively activates the first or second light generator by successively actuating the trigger.

14. An indicia reader in accordance with claim 12, further comprising a display for utilization by an operator to select either the first or second light generator and wherein the operator activates the selected light generator with the trigger.

15. An indicia reader in accordance with claim 12,
  wherein activation of the first light generator is accomplished by successively actuating the trigger with a first time delay between successive trigger actuations, and
  wherein activation of the second light generator is accomplished by successively actuating the trigger with a second time delay between successive trigger actuations, the second time delay being either shorter or longer than the first time delay.

16. An indicia reader in accordance with claim 12, wherein selectively activating comprises at least one of the following: a single pull trigger pull initiates alternating the first and second light generators starting with the first light generator; a single pull trigger pull initiates alternating the first and second light generators starting with the second light generator; a single pull trigger pull initiates scanning starting with the first light generator and switches to the second light generator with a next trigger pull, then alternating for successive trigger pulls; a single pull trigger pull initiates scanning starting with the second light generator and switching to the first light generator with a next trigger pull, then alternating for successive trigger pulls.

17. An indicia reader in accordance with claim 12, wherein selectively activating comprises decoding an IBI with programming instruction information provided therein.

18. An indicia reader in accordance with claim 12, further comprising a notification device for audibly or visually notifying the operator whether the reader is in a near or far scanning mode.

19. An indicia reader in accordance with claim 12, wherein the first and second light beams differ in at least one of the following: shape; height; width; narrowness; intensity and scan angle of a pattern the light beam creates.

* * * * *